(12) United States Patent
Drazba et al.

(10) Patent No.: US 11,891,485 B2
(45) Date of Patent: Feb. 6, 2024

(54) SILICONE DUAL CURE RESINS FOR ADDITIVE MANUFACTURING

(71) Applicant: Carbon, Inc., Redwood City, CA (US)

(72) Inventors: Jessica D. Drazba, Redwood City, CA (US); Jason P. Rolland, San Carlos, CA (US)

(73) Assignee: Carbon, Inc., Redwood City, CA (US)

( * ) Notice: Subject to any disclaimer, the term of this patent is extended or adjusted under 35 U.S.C. 154(b) by 744 days.

(21) Appl. No.: 15/754,135

(22) PCT Filed: Nov. 4, 2016

(86) PCT No.: PCT/US2016/060440
§ 371 (c)(1),
(2) Date: Feb. 21, 2018

(87) PCT Pub. No.: WO2017/079502
PCT Pub. Date: May 11, 2017

(65) Prior Publication Data
US 2018/0244854 A1   Aug. 30, 2018

Related U.S. Application Data

(60) Provisional application No. 62/270,642, filed on Dec. 22, 2015, provisional application No. 62/251,323, filed on Nov. 5, 2015.

(51) Int. Cl.
| | | |
|---|---|---|
| *C08G 77/442* | (2006.01) | |
| *C08G 77/12* | (2006.01) | |
| *C08G 77/20* | (2006.01) | |
| *B33Y 70/00* | (2020.01) | |
| *B33Y 10/00* | (2015.01) | |
| *C08L 83/10* | (2006.01) | |
| *B33Y 80/00* | (2015.01) | |
| *C08L 83/06* | (2006.01) | |
| *C08K 5/56* | (2006.01) | |
| *C08L 83/00* | (2006.01) | |
| *B29C 64/129* | (2017.01) | |
| *B29K 83/00* | (2006.01) | |
| *B29K 105/00* | (2006.01) | |

(52) U.S. Cl.
CPC .......... *C08G 77/442* (2013.01); *B29C 64/129* (2017.08); *B33Y 10/00* (2014.12); *B33Y 70/00* (2014.12); *B33Y 80/00* (2014.12); *C08G 77/12* (2013.01); *C08G 77/20* (2013.01); *C08K 5/56* (2013.01); *C08L 83/00* (2013.01); *C08L 83/06* (2013.01); *C08L 83/10* (2013.01); *B29K 2083/00* (2013.01); *B29K 2105/0014* (2013.01)

(58) Field of Classification Search
CPC .......................... C08G 77/442; B29C 64/129
See application file for complete search history.

(56) References Cited

U.S. PATENT DOCUMENTS

| | | |
|---|---|---|
| 4,173,682 A | 11/1979 | Noomen et al. |
| 4,389,514 A | 6/1983 | Schmidle et al. |
| 4,421,822 A | 12/1983 | Levens |
| 4,528,081 A | 7/1985 | Lien et al. |
| 4,603,168 A | 7/1986 | Sasaki et al. |
| 5,063,254 A | 11/1991 | Nakos |
| 5,082,590 A | 1/1992 | Araud |
| 5,236,637 A | 8/1993 | Hull |
| 5,264,061 A | 11/1993 | Juskey et al. |
| 5,298,532 A | 3/1994 | Ali |
| 5,310,869 A | 5/1994 | Lewis et al. |
| 5,418,112 A | 5/1995 | Mirle et al. |
| 5,629,133 A | 5/1997 | Wolf et al. |
| 5,674,921 A | 10/1997 | Regula et al. |
| 5,679,719 A | 10/1997 | Klemarczyk et al. |
| 5,695,708 A | 12/1997 | Karp et al. |
| 6,309,797 B1 | 10/2001 | Grinevich et al. |
| 6,451,870 B1 * | 9/2002 | DeCato ................ C09D 183/04 522/40 |
| 7,105,584 B2 | 9/2006 | Chambers et al. |
| 7,438,846 B2 | 10/2008 | John |

(Continued)

FOREIGN PATENT DOCUMENTS

| | | |
|---|---|---|
| CN | 1270614 | 10/2000 |
| CN | 103571211 | 2/2014 |

(Continued)

OTHER PUBLICATIONS

World Health Organization: Hydroquinone Health and Safety Guide, Geneva, 1996 (Year: 1996).*
C.E.Holye U of S. Miss; An Overview of Oxygen Inhibition in Photocuring RadTech May 2004 Technical Proceedings (Year: 2004).*
Machine Translation of CN103571211 (Year: 2014).*
SiSiB Silicones: Power Chemical Corporation from http://www.PCC.asia—copyright 2009-2012 (Year: 2012).*
Excerpt from ScienceDirect: Organotin Main-Group Elements, including Noble Gases T. Kawashima, . . . J. Yoshino, in Comprehensive Inorganic Chemistry II (Second Edition), 2013 1.34.5.3.1 Tin compounds on p. 2 from website: www.sciencedirect.com/topics/chemistry/organotin (Year: 2013).*
International Search Report and Written Opinion for PCT/US2016/060440 dated Feb. 28, 2017, 13 pages.

(Continued)

*Primary Examiner* — Matthew J Daniels
*Assistant Examiner* — Wayne K. Swier
(74) *Attorney, Agent, or Firm* — Myers Bigel, P.A.

(57) ABSTRACT

A method of forming a three-dimensional object comprised of a silicone polymer is carried out by: (a) providing a silicone dual cure resin; (b) forming a three-dimensional intermediate from that resin, where the intermediate has the shape of, or a shape to be imparted to, the three-dimensional object, and where the resin is solidified in that intermediate object by irradiating with light; and then (c) further reacting the three-dimensional intermediate to form the three-dimensional object. The silicone dual cure resin includes: (i) a light polymerizable first reactant; (ii) a photoinitiator; (iii) at least one additional reactant(s), and (iv) optionally a catalyst. At least one of the first reactant and the additional reactant(s) contains a siloxane linkage.

14 Claims, No Drawings

(56) References Cited

U.S. PATENT DOCUMENTS

| | | | |
|---|---|---|---|
| 7,807,744 | B2 | 10/2010 | Barnes et al. |
| 7,892,474 | B2 | 2/2011 | Shkolnik et al. |
| 8,008,420 | B2 | 8/2011 | Zhu |
| 8,084,532 | B2 | 12/2011 | Fisher et al. |
| 8,088,449 | B2 | 1/2012 | Bailey et al. |
| 9,205,601 | B2 | 12/2015 | Desimone et al. |
| 9,211,678 | B2 | 12/2015 | Desimone et al. |
| 9,216,546 | B2 | 12/2015 | Desimone et al. |
| 9,360,757 | B2 | 6/2016 | Desimone et al. |
| 9,453,142 | B2 | 9/2016 | Rolland et al. |
| 9,598,606 | B2 | 3/2017 | Rolland et al. |
| 9,676,963 | B2 | 6/2017 | Rolland et al. |
| 9,708,440 | B2 | 7/2017 | Das et al. |
| 9,777,097 | B2 | 10/2017 | Liu et al. |
| 9,982,164 | B2 | 5/2018 | Rolland et al. |
| 10,016,938 | B2 | 7/2018 | Desimone et al. |
| 10,093,064 | B2 | 10/2018 | Desimone et al. |
| 10,144,181 | B2 | 12/2018 | Desimone et al. |
| 10,150,253 | B2 | 12/2018 | Desimone et al. |
| 10,155,882 | B2 | 12/2018 | Rolland et al. |
| 10,240,066 | B2 | 3/2019 | Rolland et al. |
| 2003/0091833 | A1 | 5/2003 | Baumgart et al. |
| 2004/0014832 | A1* | 1/2004 | Baudin ............... C07F 7/0838 560/1 |
| 2004/0052966 | A1 | 3/2004 | Wilke et al. |
| 2004/0187714 | A1 | 9/2004 | Napadensky |
| 2007/0178133 | A1 | 8/2007 | Rolland |
| 2007/0205528 | A1 | 9/2007 | Patel et al. |
| 2008/0131692 | A1 | 6/2008 | Rolland et al. |
| 2010/0105794 | A1 | 4/2010 | Dietliker et al. |
| 2012/0007287 | A1 | 1/2012 | Vermeer et al. |
| 2012/0195994 | A1 | 8/2012 | El-Siblani et al. |
| 2013/0172122 | A1* | 7/2013 | Ichikawa ........... A63B 37/0062 473/378 |
| 2013/0292862 | A1 | 11/2013 | Joyce |
| 2013/0295212 | A1 | 11/2013 | Chen et al. |
| 2015/0072293 | A1* | 3/2015 | DeSimone ........... B29C 64/245 430/322 |
| 2015/0322291 | A1 | 11/2015 | Salviato et al. |

FOREIGN PATENT DOCUMENTS

| | | | | |
|---|---|---|---|---|
| CN | 103571211 | A * | 2/2014 | |
| EP | 0339841 | A2 * | 4/1989 | ............. G06F 21/53 |
| EP | 0442071 | | 8/1991 | |
| EP | 0525578 | | 2/1993 | |
| EP | 0562826 | | 9/1993 | |
| EP | 339841 | A2 * | 7/1995 | ........... A61K 6/0023 |
| EP | 0830641 | | 3/1998 | |
| EP | 1341039 | | 9/2003 | |
| EP | 1918316 | | 5/2008 | |
| EP | 2224874 | | 9/2010 | |
| JP | H02111528 | | 4/1990 | |
| JP | H09-194540 | | 7/1997 | |
| JP | 2000-007641 | | 1/2000 | |
| WO | 92/07705 | | 5/1992 | |
| WO | 96/00412 | | 1/1996 | |
| WO | 2001/026023 | | 4/2001 | |
| WO | 2006/045002 | | 4/2006 | |
| WO | 2008/076184 | | 6/2008 | |
| WO | 2009/021256 | | 2/2009 | |
| WO | 2015/017421 | | 2/2015 | |
| WO | 2015/077419 | | 5/2015 | |
| WO | 2015/164234 | | 10/2015 | |
| WO | 2015/200173 | | 12/2015 | |
| WO | WO-2015200173 | A1 * | 12/2015 | ........... G03F 7/0757 |

OTHER PUBLICATIONS

Malik et al. "A thermally reworkable UV curable acrylic adhesive prototype" International Journal of Adhesion & Adhesives, 22: 283-289 (2002).

Malik et al. "Comparative Study of Novel Polymer Prototype for Controlled Thermally Reworkable UV Curable Acrylic Adhesives in Absence and Presence of Reactive Diluent" Surface Engineering, 19(2): 121-126 (2003).

Malik et al. "Computational study of thermally controlled polymer network disassembly via the incorporation of sterically hindered urea linkages" Polymer, 43: 2561-2567 (2002).

Malik et al. "The thermally controlled molecular disassembly properties of a polymer network via the incorporation of one sterically hindered urea linkage" Polymer Degradation and Stability, 76: 241-249 (2002).

Malik et al. "Thermally Controlled Molecular Disassembly of a Crosslinked Polymer Network by the Incorporation of Sterically Hindered Urea Linkages" Journal of Applied Polymer Science, 85: 856-864 (2002).

Pan et al. "A Fast Mask Projection Steriolithography Process for Fabricating Digital Models in Minutes" J. Manufacturing Sci. and Eng., 134, 9 pages (2012).

Tumbleston et al. Supplementary materials "Continuous liquid interface production of 3D Objects" Science, 347(6228):1349-1352 (2015).

Park et al. "UV- and thermal-curing behaviors or dual-curable adhesives based on epoxy acrylate oligomers" International Journal of Adhesion and Adhesives, 29(7): 710-717 (2009).

Infuehr et al. "Functional polymers by two-photon 3D lithography" Applied Surface Science, 254(4):836-840 (2007).

Bichler et al. "Functional flexible organic-inorganic hybrid polymer for two photon patterning of optical waveguides" Optical Materials, 34(5):772-780 (2012).

Bhattacharjee et al. "Writing in the granular gel medium" Materials Science, 1(8): 6 pages (2015).

Velandkar et al. "High-performance UV-curable urethane acrylates via deblocking chemistry" Journal of Applied Polymer Science, 62(9):1361-1376 (1996).

* cited by examiner

SILICONE DUAL CURE RESINS FOR ADDITIVE MANUFACTURING

RELATED APPLICATIONS

This application is a 35 U.S.C. § 371 national phase entry of International Application No. PCT/US2016/060440, filed Nov. 4, 2016, and which claims the benefit of U.S. Provisional Patent Application Ser. No. 62/251,323, filed Nov. 5, 2015, and of U.S. Provisional Patent Application Ser. No. 62/270,642, filed Dec. 22, 2015, the disclosures of both of which are incorporated by reference herein in their entirety.

FIELD OF THE INVENTION

The present invention concerns materials, methods and apparatus for the fabrication of solid three-dimensional objects from liquid materials, and objects so produced.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object. An early example is Hull, U.S. Pat. No. 5,236,637. Other approaches are shown in U.S. Pat. Nos. 7,438,846, 7,892,474; M. Joyce, US Patent App. 2013/0292862; Y. Chen et al., US Patent App. 2013/0295212 (both Nov. 7, 2013); Y. Pan et al., *J. Manufacturing Sci. and Eng.* 134, 051011-1 (October 2012), and numerous other references. Materials for use in such apparatus are generally limited, and there is a need for new resins which will provide diverse material properties for different product families for three-dimensional fabrication to achieve its full potential.

SUMMARY OF THE INVENTION

In general, in the present invention, a method of forming a three-dimensional object comprised of a silicone polymer is carried out by:

(a) providing a silicone dual cure resin; wherein the silicone dual cure resin comprises: (i) a light polymerizable first reactant; (ii) a photoinitiator; (iii) at least one additional reactant(s), (iv) optionally a catalyst, and (v) optionally filler, diluent, inhibitor, stalizer, oxygen scavenger, etc., including combinations thereof, wherein at least one of the first reactant and the additional reactant(s) contains at least one siloxane linkage (e.g., at least one comprises a siloxane or organosilane oligomer or polymer);

(b) forming a three-dimensional intermediate from the resin, wherein the intermediate has the shape of, or a shape to be imparted to, the three-dimensional object, and wherein the resin is solidified in said intermediate by irradiating with light; then (c) optionally, but in some embodiments preferably, washing the three-dimensional intermediate; and then (d) further reacting said three-dimensional intermediate, said further reacting sufficient to form from the three-dimensional intermediate the three-dimensional object comprised of a silicone polymer (e.g., where the silicone component of the polymer arises from the irradiating step, the further reacting step, or both the irradiating step and the further reacting step).

Resins useful for carrying out such methods, and products produced from such methods, are also described.

In some embodiments of the methods and compositions described above and below, the polymerizable liquid (or "dual cure resin") has a viscosity of 100, 200, 500 or 1,000 centipoise or more at room temperature and/or under the operating conditions of the method, up to a viscosity of 10,000, 20,000, or 50,000 centipoise or more, at room temperature and/or under the operating conditions of the method.

In particular embodiments, the step of forming the three-dimensional intermediate is carried out by additive manufacturing, such as by "top down" or "bottom up" additive manufacturing. In some preferred embodiments, the step of forming the three-dimensional intermediate is carried out by continuous liquid interface production (CLIP).

Resins useful for carrying out the methods, and products produced thereby, are also described herein.

In some embodiments, the product or three-dimensional object produced comprises a polymer blend, interpenetrating polymer network, semi-interpenetrating polymer network, or sequential interpenetrating polymer network.

Non-limiting examples and specific embodiments of the present invention are explained in greater detail in the specification set forth below. The disclosures of all United States Patent references cited herein are to be incorporated herein by reference in their entirety.

DETAILED DESCRIPTION OF ILLUSTRATIVE EMBODIMENTS

The present invention is now described more fully hereinafter, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product).

"Hydrosilylation inhibitors" as used herein may be used to prevent or slow (depending on temperature) the hydrosilylation catalysis reaction and include, but are not limited to, volatile and non-volatile platinum catalyst inhibitors for hydrosilylation such as vinyl-containing cyclic organo-siloxanes (e.g., 2,4,6,8-tetramethyl-2,4,6,8-tetravinylcyclotetrasiloxane), acetylenic alcohols (e.g., 2-methyl-3-butyn-3-ol, 1-ethynyl-1-cyclohexanol, etc.), heterocyclic amines (e.g., pyridine), and alkyl maleates.

"Moisture-cure condensation retarders" as used herein may be used to slow the moisture-cure condensation reaction and may include, but are not limited to, sacrificial silanols or alkoxy silane small molecules (e.g., trimethoxy (octyl)silane, triethoxy(ethyl)silane), etc.

"Stabilizers" as used herein includes, but is not limited to, hydroquinones (e.g., hydroquinone and hydroquinone monomethyl ether) and catechols (e.g., 4-tert-butylcatechol) for stabilizing reactive monomers or oligomers such as acrylates or methacrylates. Stabilizers can also include antioxidants and additives used for increasing the long-term stability of printed polymer-based materials. Examples include hindered amine light stabilizers, primary and secondary antioxidants, including hindered or semi-hindered phenols, thiosynergists, phosphites, hydroxylamines, and hindered amines.

"Oxygen scavenger" as used herein includes, but is not limited to, hydrogen donors such as silanes (e.g., tris(trimethylsilyl)silane), thiols and amines, especially tertiary aliphatic amines such as triethanol amine.

1. Resins.

"Silicone polymer" as used herein includes both (i) polymers in which the backbone is entirely silicone (typically, a series of Si—O—Si linkages) also referred to as siloxane polymers, and (ii) polymers in which the backbone contains one or more carbons, also referred to as "organosilane polymers." The silicone polymers may optionally be in the form of copolymers, with other silicone polymers, or with organic polymers. Reactants themselves may be silicone polymers (including short polymers, also referred to as "oligomers") that contain further reactive groups as discussed below.

Silicone dual cure resins for producing silicone polymers may comprise four different types of functional siloxane monomeric units, depending on whether the silicon atoms have one, two, three, or four oxygen linkages, and are typically designated M, D, T, or Q, respectively. The functional siloxane monomeric units may be included in the resin as monomers, oligomers and/or polymers thereof, so long as the resin includes sufficient reactive groups (e.g., acrylate and/or vinyl groups) for reaction in the first actinic/light/UV cure, or second further cure step. The resin may contain the different monomeric units independently or in combination with one another—e.g., as oligomeric units (although note that a network of only Q groups becomes fused quartz). Thus examples of dual cure resins for use in the present thus include, but are not limited to, those comprising (along with the light polymerizable components), an MM resin, an MD resin, a DT resin, an MT resin, an MDT resin, a DTQ resin, an MTQ resin, an MDTQ resin, a DQ resin, an MQ resin, a DTQ resin, an MTQ resin, or an MDQ resin. See, e.g., U.S. Pat. Nos. 8,088,449; 8,084,532; 8,008,420; 7,807,744; 5,082,590; and 5,063,254.

Particular choices of functional groups on the monomeric or oligomeric units will depend upon the particular reaction system for the first or second cure, and are discussed further below.

In some embodiments, the light polymerizable first reactant(s) (e.g., monomers and/or prepolymers polymerizable by exposure to actinic radiation or light) are those comprising reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers. See, e.g., US Patent Application Publication No. 2015/0072293 to DeSimone et al.

In some particular embodiments, the light polymerizable first reactant contains an alkene or alkyne linkage, preferably an acrylate or methacrylate linkage.

In some embodiments, the light absorbing pigment or dye is:

(i) titanium dioxide (e.g., in an amount of from 0.01 or 0.05 or 0.1 to 1 or 5 percent by weight), (ii) carbon black (e.g., in an amount of from 0.01 or 0.05 or 0.1 to 1 or 5 percent by weight), and/or (iii) an organic ultraviolet light absorber (e.g., a hydroxybenzophenone, hydroxyphenylbenzotriazole, oxanilide, benzophenone, thioxanthone, hydroxyphenyltriazine, and/or benzotriazole ultraviolet light absorber) (e.g., in an amount of 0.001 or 0.005 to 1 or 2 percent by weight).

In some embodiments, the photoinitiator comprises an organic small molecule, oligomer or polymer that absorbs UV light and/or visible light in the range of 200-500 nm (e.g., a benzyl ketal, hydroxyacetophenone, alkylaminoacetophenone, phosphine oxide, benzophenone, substituted benzophenone, thioxanthone, anthraquinone, and/or camphorquinone). Additional tertiary amine synergists (e.g., alkylamines, alkanolamines, ethanolamines (such as methyldiethanolamine, triethanol amine or dimethylethanolamine), or aminobenzoates (esters such as ethyl p-dimethylaminobenzoate or 2-ethylhexyl 4-aminobenzoate)) or hydrogen donors (e.g., an alcohol, ether, or thiol) may be included.

In some embodiments, the diluent comprises an acrylate, a methacrylate, a styrene, an acrylic acid, a vinylamide, a vinyl ether, a vinyl ester, polymers containing any one or more of the foregoing, and combinations of two or more of the foregoing.

In some embodiments, the polymerizable liquid comprises:

(i) from 0.01 or 0.1 to 4 percent by weight of said photoinitiator, (ii) from 10 to 90 percent by weight of said first reactant (e.g., monomers and/or prepolymers that are polymerizable by exposure to actinic radiation or light)

(iii) from 0.01 or 0.05 or 0.1 to 2 or 3 percent by weight of said light absorbing pigment or dye when present, (iv) from 10 to 90 percent by weight of said second monomers and/or prepolymers that are polymerizable by thermally heating, microwave irradiating, exposure to moisture, e-beam irradiating, irradiating with light, or a combination thereof.

(v) from 10 ppm to 2 percent by weight of said catalyst when present, (vi) from 1 to 40 percent by weight of said diluent when present, (vii) from 1 to 50 percent by weight of said filler when present, (viii) optionally, but in some embodiments preferably, from 0.001 or 0.01 to 1 or 2 percent by weight of an inhibitor for the light or thermally curable components of the resin when present;

(ix) optionally, but in some embodiments preferably, from 0.001 or 0.01 to 1 or 2 percent by weight of a stabilizer for the light or thermally curable components of the resin when present; and, (x) from 0.01 to 2 or 3 percent by weight of an oxygen scavenger when present.

In some embodiments the resin mixture contains inhibitors and/or stabilizers for the light or thermally curable components of the resin.

In some embodiments the resin mixture contains an oxygen scavenger.

In some embodiments, a Lewis acid or an oxidizable tin salt is included in the polymerizable liquid (e.g., in an amount of from 0.01 or 0.1 to 1 or 2 percent by weight, or more) in an amount effective to accelerate the formation of the three-dimensional intermediate object during the production thereof. Oxidizable tin salts useful for carrying out the present invention include, but are not limited to, stannous butanoate, stannous octoate, stannous hexanoate, stannous heptanoate, stannous linoleate, stannous phenyl butanoate, stannous phenyl stearate, stannous phenyl oleate, stannous nonanoate, stannous decanoate, stannous undecanoate, stannous dodecanoate, stannous stearate, stannous oleate stannous undecenoate, stannous 2-ethylhexoate, dibutyl tin dilaurate, dibutyl tin dioleate, dibutyl tin distearate, dipropyl tin dilaurate, dipropyl tin dioleate, dipropyl tin distearate, dibutyl tin dihexanoate, and combinations thereof. See also U.S. Pat. Nos. 5,298,532; 4,421,822; and 4,389,514, the disclosures of which are incorporated herein by reference. In addition to the foregoing oxidizable tin salts, Lewis acids such as those described in Chu et al. in Macromolecular Symposia, Volume 95, Issue 1, pages 233-242, June 1995 are known to enhance the polymerization rates of free-radical polymerizations and are included herein by reference.

Any suitable filler may be used in connection with the present invention, depending on the properties desired in the part or object to be made. Thus, fillers may be solid or liquid, organic or inorganic, and may include reactive and non-reactive rubbers: reactive or non-reactive siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.), reactive or non-reactive inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners.

One or more polymeric and/or inorganic tougheners can be used as a filler in the present invention. See generally US Patent Application Publication No. 20150215430. The toughener may be uniformly distributed in the form of particles in the cured product. The particles could be less than 5 microns (um) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers whose composition is described in U.S. Pat. No. 6,894,113 (Court et al., Atofina, 2005) and include "NANOSTRENGTH®" SBM (polystyrene-polybutadiene-polymethacrylate), and AMA (polymethacrylate-polybutylacrylate-polymethacrylate), both produced by Arkema™. Other suitable block copolymers include FORTEGRA™ and the amphiphilic block copolymers described in U.S. Pat. No. 7,820,760B2, assigned to Dow Chemical. Examples of known core-shell particles include the core-shell (dendrimer) particles whose compositions are described in US20100280151A1 (Nguyen et al., Toray Industries, Inc., 2010) for an amine branched polymer as a shell grafted to a core polymer polymerized from polymerizable monomers containing unsaturated carbon-carbon bonds, core-shell rubber particles whose compositions are described in EP 1632533A1 and EP 2123711A1 by Kaneka Corporation, and the "KaneAce MX" product line of such particle/epoxy blends whose particles have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers, as discussed further below. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers. Examples of suitable oxide particles include NANOPOX® produced by nanoresins AG. This is a master blend of functionalized nanosilica particles and an epoxy. Additional examples of core-shell rubber tougheners include, but are not limited to, those described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere.

2. Methods.

The three-dimensional intermediate is preferably formed from resins as described above by additive manufacturing, typically bottom-up or top-down additive manufacturing. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce and 2013/0295212 to Chen et al., PCT Application Publication No. WO 2015/164234 to Robeson et al., PCT Application Publication No. WO 2016/133759 to Craven et al., and PCT Application Publication No. WO 2016/145182 to Rolland. The disclosures of these patents and applications are incorporated by reference herein in their entirety.

In general, top-down three-dimensional fabrication may be carried out by:

(a) providing a polymerizable liquid reservoir having a polymerizable liquid fill level and a carrier positioned in the reservoir, the carrier and the fill level defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light to form a solid polymer scaffold from the first component and also advancing (typically lowering) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

A wiper blade, doctor blade, or optically transparent (rigid or flexible) window, may optionally be provided at the fill level to facilitate leveling of the polymerizable liquid, in accordance with known techniques. In the case of an optically transparent window, the window provides a build surface against which the three-dimensional intermediate is formed, analogous to the build surface in bottom-up three-dimensional fabrication as discussed below.

In general, bottom-up three-dimensional fabrication may be carried out by:

(a) providing a carrier and an optically transparent member having a build surface, the carrier and the build surface defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light through said optically transparent member to form a solid polymer scaffold from the first component and also advancing (typically raising) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

In some embodiments of bottom-up or top-down three-dimensional fabrication as implemented in the context of the present invention, the build surface is stationary during the formation of the three-dimensional intermediate; in other embodiments of bottom-up three-dimensional fabrication as implemented in the context of the present invention, the build surface is tilted, slid, flexed and/or peeled, and/or otherwise translocated or released from the growing three-dimensional intermediate, usually repeatedly, during formation of the three-dimensional intermediate.

In some embodiments of bottom-up or top-down three-dimensional fabrication as carried out in the context of the present invention, the polymerizable liquid (or resin) is maintained in liquid contact with both the growing three dimensional intermediate and the build surface during both the filling and irradiating steps, during fabrication of some of, a major portion of, or all of the three-dimensional intermediate.

In some embodiments of bottom-up or top-down three-dimensional fabrication as carried out in the context of the present invention, the growing three-dimensional intermediate is fabricated in a layerless manner (e.g., through multiple exposures or "slices" of patterned actinic radiation or light) during at least a portion of the formation of the three-dimensional intermediate.

In some embodiments of bottom-up or top-down three-dimensional fabrication as carried out in the context of the present invention, the growing three-dimensional intermediate is fabricated in a layer-by-layer manner (e.g., through multiple exposures or "slices" of patterned actinic radiation or light), during at least a portion of the formation of the three-dimensional intermediate.

In some embodiments of bottom-up or top-down three-dimensional fabrication employing a rigid or flexible optically transparent window, a lubricant or immiscible liquid may be provided between the window and the polymerizable liquid (e.g., a fluorinated fluid or oil such as a perfluoropolyether oil).

From the foregoing it will be appreciated that, in some embodiments of bottom-up or top down three-dimensional fabrication as carried out in the context of the present invention, the growing three-dimensional intermediate is fabricated in a layerless manner during the formation of at least one portion thereof, and that same growing three-dimensional intermediate is fabricated in a layer-by-layer manner during the formation of at least one other portion thereof. Thus, operating mode may be changed once, or on multiple occasions, between layerless fabrication and layer-by-layer fabrication, as desired by operating conditions such as part geometry.

In preferred embodiments, the intermediate is formed by continuous liquid interface production (CLIP). CLIP is known and described in, for example, PCT Applications Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as US 2015/0097316, and U.S. Pat. No. 9,216,546 on Dec. 22, 2015), and in J. Tumbleston, D. Shirvanyants, N. Ermoshkin et al., Continuous liquid interface production of 3D Objects, Science 347, 1349-1352 (published online 16 Mar. 2015). In some embodiments, CLIP employs features of a bottom-up three-dimensional fabrication as described above, but the the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone.

In some embodiments, the stable liquid interface may be achieved by other techniques, such as by providing an immiscible liquid as the build surface between the polymerizable liquid and the optically transparent member, by feeding a lubricant to the build surface (e.g., through an optically transparent member which is semipermeable thereto, and/or serves as a reservoir thereof), etc.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

Inhibitors, or polymerization inhibitors, for use in the present invention may be in the form of a liquid or a gas. In some embodiments, gas inhibitors are preferred. In some embodiments, liquid inhibitors such as oils or lubricants may be employed. In further embodiments, gas inhibitors which are dissolved in liquids (e.g., oils or lubricants) may be employed. For example, oxygen dissolved in a fluorinated fluid. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g. by pausing, and resuming, the advancing step, increasing, then decreasing, the intensity of irradiation, and combinations thereof).

CLIP may be carried out in different operating modes (that is, different manners of advancing the carrier and build surface away from one another), including continuous, intermittent, reciprocal, and combinations thereof.

Thus in some embodiments, the advancing step is carried out continuously, at a uniform or variable rate, with either constant or intermittent illumination or exposure of the build area to the light source.

In other embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In some embodiments, the rate of advance (whether carried out sequentially or continuously) is from about 0.1, 1, or 10 microns per second, up to about to 100, 1,000, or 10,000 microns per second, again depending on factors such as temperature, pressure, structure of the article being produced, intensity of radiation, etc.

In still other embodiments, the carrier is vertically reciprocated with respect to the build surface to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the solidifiable or polymerizable liquid is changed at least once during the method with a subsequent solidifiable or polymerizable liquid (e.g., by switching a "window" or "build surface" and associated reservoir of polymerizable liquid in the apparatus); optionally where the subsequent solidifiable or polymerizable liquid is cross-reactive with each previous solidifiable or polymerizable liquid during the subsequent curing, to form an object having a plurality of structural segments covalently coupled to one another, each structural segment having different structural (e.g., tensile) properties (e.g., a rigid funnel or liquid connector segment, covalently coupled to a flexible pipe or tube segment).

Once the three-dimensional intermediate is formed, it may be removed from the carrier, optionally washed, any supports optionally removed, and then further reacted sufficiently to further cure the resin and form the three-dimensional object.

Washing may be carried out with any suitable organic or aqueous wash liquid, or combination thereof, including solutions, suspensions, emulsions, microemulsions, etc. Examples of suitable wash liquids include, but are not limited to water, alcohols (e.g., methanol, ethanol, isopropanol, etc.), benzene, toluene, etc. Such wash solutions may optionally contain additional constituents such as surfactants, etc. A currently preferred wash liquid is isopropanol. Wash methods such as those described in U.S. Pat. No. 5,248,456 may be employed and are included herein.

Such further reacting may be by heating the intermediate, microwave irradiating the intermediate, contacting the intermediate to moisture, e-beam irradiating the intermediate, irradiating the intermediate with light at a different wavelength than the light of another step, irradiating said intermediate with light at the same wavelength as but at greater intensity than the light of another step, or a combination thereof.

Depending on the choice of resin constituents, the further reacting step may comprise:

(i) a hydrosilylation reaction,
(ii) a silanol or alkoxy silane-based moisture-cure condensation reaction,
(iii) a free-radical reaction initiated by a peroxide or a photoinitiator,
(iv) a nucleophilic substitution reaction (e.g., with compounds containing strained ring functional groups such as epoxide and aziridine groups),
(v) a urethane reaction,
(vi) a 3+2 cycloaddition reaction (e.g., a Huisgen 1,3 dipolar cycloaddition between an azide and an alkyne, typically catalyzed by a copper catalyst),
(vii) a thiolene or thiolyne reaction,
(viii) a Diels-Alder reaction,
(ix) a 4+1 cycloaddition reaction (e.g., between isonitriles (isocyanides) and tetrazines),
(x) a trimerization of cyanate esters (e.g., by heating or microwave irradiating, optionally in the presence of a catalyst) to form a triazene; or
(xi) a combination of the foregoing.

In some embodiments, the further reacting step comprises a hydrosilylation reaction, and: (i) the additional reactant contains a silyl hydride, (ii) the polymerizable liquid includes a metal-centered catalyst that can be activated by light or heat (e.g., platinum, ruthenium, or rhodium catalyst) as an additional component, and (iii) the polymerizable liquid optionally includes, at least one alkene-functionalized or alkyne-functionalized reactant (e.g., a vinyl-silicone compound).

In some embodiments, the further reacting step comprises a silanol or alkoxy silane-based moisture-cure condensation reaction, and: (i) the additional reactant contains a silanol (Si—OH) or alkoxy silane (Si—OR) functional group, and (ii) the polymerizable liquid further comprises a base catalyst or an acid catalyst (e.g., a Bronsted acid catalyst or Lewis acid catalyst) as an additional component. Water may be required for this reaction, and atmospheric water/moisture may be sufficient.

In some embodiments, the further reacting step comprises a free-radical reaction initiated by a peroxide or photoinitiator, and: (i) the additional reactant contains at least one alkene or alkyne functional group, and (ii) the polymerizable liquid comprises a radical generating peroxide or photoinitiator as an additional component.

In some embodiments, the further reacting step comprises an epoxy reaction, and: (i) the additional reactant contains an epoxide functional group; and (ii) the polymerizable liquid optionally includes at least one of an amine, alcohol, anhydride, an alcohol catalyst, an acid catalyst, or combination thereof as an additional component.

In some embodiments, the further reacting step comprises a urethane reaction, and: (i) the additional reactant contains an isocyanate functional group or a blocked isocyanate functional group, and (ii) the polymerizable liquid optionally includes at least one of an amine, alcohol, thiol, anhydride, alcohol catalyst, acid catalyst, or combination thereof as an additional component. Water may be required for this reaction, and atmospheric water/moisture may be sufficient.

In some embodiments, the further reacting step comprises a thiolene or thiolyne reaction, and: (i) the additional reactant contains a thiol, and (ii) the polymerizable liquid optionally includes at least one alkene-functionalized or alkyne-functionalized reactant (e.g., a vinyl-silicone compound).

In some embodiments, a heating step is carried out at one (oven) temperature. In other embodiments, a heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final temperature of 250 or 300° C., at a change in heating rate of 0.5° C. per minute, to 5° C. per minute. (See, e.g., U.S. Pat. No. 4,785,075).

Note that, where multiple light steps are employed (i.e., where the three-dimensional intermediate is exposed to light to produce the product), the spectra of the light for each step may overlap in whole or in part, but intensity and/or range of spectra may be varied, depending upon the absorption characteristics of the pertinent initiator and/or sensitizer used in the composition, to optimize activation of a particular reaction.

It will be clear to those skilled in the art that the materials described in the current invention will be useful in other additive manufacturing techniques, including ink-jet printer-based methods.

3. Products.

Products produced from the resins and methods described above include products for which biocompatibility is a desired attribute, such as, among other things, cosmetic, reconstructive and prosthetic surgical implants (e.g., facial implants, including chin, ear, nose, lip, and orbital implants, etc.), breast implants, etc., including body part mimetics (e.g., reproduction or mimetics of hand, foot, face, etc., including portions or subcomponents thereof), base sockets for prosthetic limbs, joint replacements (e.g., for fingers and toes), sclera buckles for the treatment of retinal disease, drains (e.g., for glaucoma therapy), tubes for ear drainage (myringotomy), vaginal rings (e.g., for drug release), implantable valves (e.g., for hydrocephaly drains), fallopian tube plugs, gastric bands, breathing masks such as continuous positive airway pressure (CPAP) masks, seals and septa for medicinal or vascular access ports; urological catheters, headers for implantable devices such as defibrillators, pacemakers and cardioverters, oxygen-permeable bandages, contact lenses, intraocular implants, etc.

In addition, products produced from the resins and methods described above include products for which clarity/light transmissivity, resilience, and/or temperature tolerance are desired attributes, including light fixtures and elements such as lenses, waveguides, light housings, and the like (e.g., for LED, incandescent, fluorescent, and luminescent light sources, etc.).

In addition, products produced from the resins and methods described above include products for which good rebound properties or resilience is desired, such as protective housings for electronic devices, springs (e.g., as a portion of an electrical sensor), shock absorbers, multi-material fluid or hydraulic actuators (soft robotic devices), etc.

In addition, products produced from the resins and methods described above include products for which damping properties are desired, such as vibrational isolators for electronic devices, impact isolators and noise isolators.

In addition, products produced from the resins and methods described above include products for which solvent and chemical resistance is a desired attribute, such as microfluidic devices, chromatography stationary phase devices (e.g., for gas chromatography), etc.

In addition, products produced from the resins and methods described above include products for which a wide temperature range of operation is a desired attribute, such as gaskets, vent ducts, etc.

Molds or dies for casting or molding may be produced from the resins and methods described above, including but not limited to spin-casting molds, injection molding molds, and molds for other types of processes. The molds may be used to form or cast materials such as ice and food products (both in home kitchen and industrial food manufacturing applications), as well as molds for forming objects from other resins, foams, rubber, metals (particularly low-temperature alloys), etc.

Additional products that can be produced from the resins and methods described herein include, but are not limited to, commercial and household cookware (knives, forks, spoons, spatulas, molds, steamers, poachers, lids, pads, mats, potholders, trivets, ice-cube trays, etc.).

In the Examples set forth below, the following reagents are used, except where indicated otherwise.

Example 1

This example represents one embodiment of a basic resin formulation for carrying out the present invention.

2-Methyl-1[4-(methylthio)phenyl]-2-morpholinopropan-1-one (Irgacure 907), 2-isopropylthioxanthone (ITX), N,N-dimethyloctylamine, an acrylate functionalized polydimethylsilxoane reagent (Bluestar Silicones UV RCA 170) and an addition cure, Pt catalyst-based, hydrosilylation polydimethylsiloxane system (Siltech CR9-136 Part A and Part B, which contain silicone oligomers or polymers with silyl hydride or vinyl functional groups, a platinum catalyst and a thermal catalyst inhibitor) were combined with a THINKY™ mixer for 25 minutes at 2000 rpm and then centrifuged for 5 minutes at 4000 rpm to remove undissolved photoinitiator. The homogenous solution was loaded into a continuous liquid interface production (CLIP) additive manufacturing printer and ultraviolet curing produced a three-dimensional intermediate. The three-dimensional intermediate was then thermally cured at 120° C. for 3 hours to produce the final silicone rubber product. Parts by weight and tensile properties (as determined by an INSTRON testing apparatus, 50 mm/min strain rate) for printed bar specimens (100 mm×9 mm×2.6 mm) are given in the Table below.

|  | Parts by weight |
|---|---|
| Irgacure 907 | 0.5 |
| ITX | 0.05 |
| N,N-dimethyloctylamine | 1.5 |
| UV RCA 170 | 47.95 |
| CR9-136 | 50 |
| Tensile Strength (MPa) | 0.73 ± 0.08 |
| % Elongation at Break | 133 ± 15 |

Example 2

This example representants an embodiment that contains a secondary curing system that is based on hydrosilylation but is different than the secondary system in Example 1.

2-Methyl-1[4-(methylthio)phenyl]-2-morpholinopropan-1-one (Irgacure 907), 2-isopropylthioxanthone (ITX), N,N-dimethyloctylamine, an acrylate functionalized polydimethylsilxoane reagent (Bluestar Silicones UV RCA 170) and an addition cure, Pt catalyst-based, hydrosilylation polydimethylsiloxane system (Bluestar Silicones Bluesil RTV 1556 Part A and Part B) were combined with a THINKY™ mixer for 21 minutes at 2000 rpm, and then centrifuged for 5 minutes at 4000 rpm to remove undissolved photoinitiator. The homogenous solution was loaded into a continuous liquid interface production (CLIP) additive manufacturing printer and ultraviolet curing produced a three-dimensional intermediate. The three-dimensional intermediate was then thermally cured at 120° C. for 3 hours to produce the final silicone rubber product. Parts by weight and tensile properties (as determined by an INSTRON testing apparatus, 50 mm/min strain rate) for printed bar specimens (100 mm×9 mm×2.6 mm) are given in the Table below.

|  | Parts by weight |
|---|---|
| Irgacure 907 | 0.5 |
| ITX | 0.05 |
| N,N-dimethyloctylamine | 1.5 |
| UV RCA 170 | 47.95 |
| RTV 1556 | 50 |
| Tensile Strength (MPa) | 0.43 ± 0.13 |
| % Elongation at Break | 72 ± 10 |

Example 3

This example representants an embodiment that contains an additional platinum catalyst that is UV and thermally active.

2-Methyl-1[4-(methylthio)phenyl]-2-morpholinopropan-1-one (Irgacure 907), 2-isopropylthioxanthone (ITX), N,N-dimethyloctylamine, an acrylate functionalized polydimethylsilxoane reagent (Bluestar Silicones UV RCA 170), platinum(II) acetylacetonate ($Pt(acac)_2$), and an addition cure, Pt catalyst-based, hydrosilylation polydimethylsiloxane system (Siltech CR9-136 Part A and Part B, which contain silicone oligomers or polymers with silyl hydride or vinyl functional groups, a platinum catalyst and a thermal catalyst inhibitor) were combined with a THINKY™ mixer for 25 minutes at 2000 rpm, and then centrifuged for 5 minutes at 4000 rpm to remove undissolved photoinitiator. The homogenous solution was loaded into a continuous liquid interface production (CLIP) additive manufacturing printer and ultraviolet curing produced a three-dimensional intermediate. The three-dimensional intermediate was then thermally cured at 120° C. for 3 hours to produce the final silicone rubber product. Parts by weight and tensile properties (as determined by an INSTRON testing apparatus, 50 mm/min strain rate) for printed bar specimens (100 mm×9 mm×2.6 mm) are given in the Table below.

|  | Parts by weight |
|---|---|
| Irgacure 907 | 0.5 |
| ITX | 0.05 |
| N,N-dimethyloctylamine | 1.5 |
| UV RCA 170 | 47.85 |
| CR9-136 | 50 |
| $Pt(acac)_2$ | 0.1 |
| Tensile Strength (MPa) | 1.78 ± 0.29 |
| % Elongation at Break | 128 ± 16 |

Example 4

This example representants an embodiment of the present invention where UV irradiation is used as the method to cure the further reactive components.

The same mixture as was described in Example 3 was used to produce a three-dimensional intermediate with the same printer and CLIP ultraviolet first curing procedure. The three-dimensional intermediate was then cured by UV irradiation of a broad-range mercury lamp (Dymax 5000-EC) for 16.5 minutes to produce the final silicone rubber product. The tensile properties (as determined by an INSTRON testing apparatus, 50 mm/min strain rate) for printed bar specimens (100 mm×9 mm×2.6 mm) are given in the Table below.

| | |
|---|---|
| Tensile Strength (MPa) | 1.23 ± 0.33 |
| % Elongation at Break | 110 ± 21 |

Example 5

This example representants an embodiment that contains a photoinitiator system that is different than Examples 1-4.

Ethyl(2,4,6-trimethylbenzoyl)phenylphosphinate (TPO-L), an acrylate functionalized polydimethylsilxoane reagent (Bluestar Silicones UV RCA 170), platinum(II) acetylacetonate (Pt(acac)$_2$), and an addition cure, Pt catalyst-based, hydrosilylation polydimethylsiloxane system (Siltech CR9-136 Part A and Part B) were combined with a THINKY™ mixer for 25 minutes at 2000 rpm. The homogenous solution was loaded into a continuous liquid interface production (CLIP) additive manufacturing printer and ultraviolet curing produced a three-dimensional intermediate. The three-dimensional intermediate was then thermally cured at 120° C. for 3 hours to produce the final silicone rubber product. Parts by weight and tensile properties (as determined by an INSTRON testing apparatus, 50 mm/min strain rate) for printed bar specimens (100 mm×9 mm×2.6 mm) are given in the Table below.

| | Parts by weight |
|---|---|
| TPO-L | 1 |
| UV RCA 170 | 48.975 |
| CR9-136 | 50 |
| Pt(acac)$_2$ | 0.025 |
| Tensile Strength (MPa) | 0.68 ± 0.07 |
| % Elongation at Break | 104 ± 9 |

Example 6

This example representants an embodiment that contains a light polymerizable first reactant that is different than Examples 1-5.

Ethyl(2,4,6-trimethylbenzoyl)phenylphosphinate (TPO-L), an acrylate functionalized polydimethylsilxoane reagent (Siltech Silmer OH ACR Di-100), a platinum catalyst solution in xylene (Siltech CR10-20A), and an addition cure, hydrosilylation polydimethylsiloxane system (Siltech CR10-24A and CR9-136 Part B) were combined with a THINKY™ mixer for 25 minutes at 2000 rpm. The homogenous solution was loaded into a continuous liquid interface production (CLIP) additive manufacturing printer and ultraviolet curing produced a three-dimensional intermediate. The three-dimensional intermediate was then thermally cured at 120° C. for 3 hours to produce the final silicone rubber product. Parts by weight and tensile properties (as determined by an INSTRON testing apparatus, 50 mm/min strain rate) for printed bar specimens (100 mm×9 mm×2.6 mm) are given in the Table below.

| | Parts by weight |
|---|---|
| TPO-L | 1 |
| Silmer OH ACR Di-100 | 48.6 |
| CR10-24A and CR9-136 Part B | 50 |
| CR10-20A | 0.4 |
| Tensile Strength (MPa) | 1.00 ± 0.18 |
| % Elongation at Break | 160 ± 25 |

Example 7

This example representants an embodiment that contains a ratio of first reactive to second reactive components different than Examples 1-6.

Ethyl(2,4,6-trimethylbenzoyl)phenylphosphinate (TPO-L), an acrylate functionalized polydimethylsilxoane reagent (Bluestar Silicones UV RCA 170), a platinum catalyst solution in xylene (Siltech CR10-20A), and an addition cure, hydrosilylation polydimethylsiloxane system (Siltech CR10-24A and CR9-136 Part B) were combined with a THINKY™ mixer for 6 minutes at 2000 rpm. The homogenous solution was loaded into a continuous liquid interface production (CLIP) additive manufacturing printer and ultraviolet curing produced a three-dimensional intermediate. The three-dimensional intermediate was then thermally cured at 120° C. for 3 hours to produce the final silicone rubber product. Parts by weight and tensile properties (as determined by an INSTRON testing apparatus, 50 mm/min strain rate) for printed bar specimens (100 mm×9 mm×2.6 mm) are given in the Table below.

| | Parts by weight |
|---|---|
| TPO-L | 1 |
| UV RCA 170 | 38.2 |
| CR10-24A and CR9-136 Part B | 60 |
| CR10-20A | 0.8 |
| Tensile Strength (MPa) | 2.14 ± 0.22 |
| % Elongation at Break | 171 ± 21 |

Example 8

This example representants an embodiment that contains an additional first reactive component.

Ethyl(2,4,6-trimethylbenzoyl)phenylphosphinate (TPO-L), an acrylate functionalized polydimethylsilxoane reagent (Bluestar Silicones UV RCA 170), an additional acrylate functionalized polydimethylsilxoane reagent (Silmer OH ACR Di-50), a platinum catalyst solution in xylene (Siltech CR10-20A), an Pt catalyst inhibitor (Silmer CR10-20B) and an addition cure, hydrosilylation polydimethylsiloxane system (Siltech CR10-24A and CR9-136 Part B) were combined with a THINKY™ mixer for 6 minutes at 2000 rpm. The homogenous solution was loaded into a continuous liquid interface production (CLIP) additive manufacturing printer and ultraviolet curing produced a three-dimensional intermediate. The three-dimensional intermediate was then thermally cured at 120° C. for 3 hours to produce the final silicone rubber product. Parts by weight and tensile properties (as determined by an INSTRON testing apparatus, 50 mm/min strain rate) for printed bar specimens (100 mm×9 mm×2.6 mm) are given in the Table below.

| | Parts by weight |
|---|---|
| TPO-L | 1 |
| UV RCA 170 | 18.9 |
| Silmer OH ACR Di-50 | 18.9 |
| CR10-24A and CR9-136 Part B | 60 |
| CR10-20A | 0.8 |
| CR10-20B | 0.4 |
| Tensile Strength (MPa) | 1.51 ± 0.13 |
| % Elongation at Break | 123 ± 8 |

Example 9

This example represents an embodiment that contains a reactive copolymer.

Ethyl(2,4,6-trimethylbenzoyl)phenylphosphinate (TPO-L), an acrylate functionalized polydimethylsilxoane reagent (Bluestar Silicones UV RCA 170), poly(dimethylsiloxane-co-diphenylsiloxane) divinyl terminated (cas 68951-96-2), and an addition cure, Pt catalyst-based, hydrosilylation polydimethylsiloxane system (Siltech CR9-136 Part A and Part B) are combined with a THINKY™ mixer for 25 minutes at 2000 rpm. The homogenous solution is loaded into a continuous liquid interface production (CLIP) additive manufacturing printer and ultraviolet curing produces a three-dimensional intermediate. The three-dimensional intermediate is then thermally cured at 120° C. for 3 hours to produce the final silicone rubber product.

The foregoing is illustrative of the present invention, and is not to be construed as limiting thereof. The invention is defined by the following claims, with equivalents of the claims to be included therein.

We claim:

1. A method of forming a three-dimensional object comprised of a silicone polymer, said method comprising:
   (a) providing a silicone dual cure resin; wherein said silicone dual cure resin comprises:
      (i) a light polymerizable first reactant;
      (ii) a photoinitiator;
      (iii) a second reactant comprising at least one siloxane linkage, and
      (iv) optionally a catalyst;
   wherein said light polymerizable first reactant optionally contains at least one siloxane linkage;
   (b) forming a solid polymer scaffold by irradiating said light polymerizable first reactant with patterned actinic radiation or light to form a three-dimensional intermediate from said resin, where said intermediate has the shape of, or a shape to be imparted to, said three-dimensional object, and wherein said second reactant is carried within the polymer scaffold in unsoldified form, whereby said three-dimensional intermediate is fabricated in a layer-by-layer or layerless manner through multiple exposures of the patterned actinic radiation or light; then
   (c) further reacting said three-dimensional intermediate, said further reacting sufficient to form said three-dimensional object comprised of a silicone polymer from said three-dimensional intermediate,
   wherein said further reacting in step (c) is carried out by a method comprising contacting said intermediate to moisture.

2. The method of claim 1, wherein said silicone dual cure resin comprises an MD resin, a DT resin, an MT resin, an MDT resin, a DTQ resin, an MTQ resin, an MDTQ resin, a DQ resin, an MQ resin, a DTQ resin, an MTQ resin, or an MDQ resin.

3. The method of claim 1, wherein said light polymerizable first reactant contains an alkene or alkyne linkage.

4. The method of claim 1, wherein said further reacting step comprises a silanol or alkoxy silane-based moisture-cure condensation reaction.

5. The method of claim 1, wherein said further reacting step comprises a moisture-cure condensation reaction, and:
   (i) said second reactant contains a silanol (Si—OH) or alkoxy silane (Si—OR) functional group, and
   (ii) said silicone dual cure resin further comprises a base catalyst or an acid catalyst.

6. The method of claim 1, wherein said forming step is carried out by additive manufacturing.

7. The method of claim 6, wherein said forming step is carried out by bottom-up three-dimensional fabrication between a carrier and a transparent member having a build surface, the carrier and the build surface optionally defining a build region therebetween, and wherein after said forming step (b) and before said further reacting step (c), said intermediate is removed from the carrier.

8. The method of claim 6, wherein said forming step is carried out by continuous liquid interface production (CLIP).

9. The method of claim 7, wherein said method further comprises vertically reciprocating said carrier with respect to the build surface to enhance or speed refilling of the build region with the resin.

10. The method of claim 1, wherein said three-dimensional object comprises a polymer blend, interpenetrating polymer network, semi-interpenetrating polymer network, or sequential interpenetrating polymer network.

11. The method of claim 1, wherein said resin further comprises a moisture-cure condensation retarder.

12. The method of claim 1, wherein said resin further comprises a stabilizer.

13. The method of claim 1, wherein said resin further comprises an oxygen scavenger.

14. The method of claim 1, wherein said light polymerizable first reactant comprises an acrylate functionalized siloxane and said second reactant comprises a silanol (Si—OH) or alkoxy silane (Si—OR) functional group, and said resin further comprises a base catalyst or an acid catalyst as an additional component.

* * * * *